(12) United States Patent
Ikeda

(10) Patent No.: US 12,501,528 B2
(45) Date of Patent: Dec. 16, 2025

(54) CIRCUIT DEVICE AND LIGHTING DEVICE

(71) Applicant: Panasonic Intellectual Property Management Co., Ltd., Osaka (JP)

(72) Inventor: Satoshi Ikeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 99 days.

(21) Appl. No.: 18/291,864

(22) PCT Filed: Jul. 21, 2022

(86) PCT No.: PCT/JP2022/028388
§ 371 (c)(1),
(2) Date: Jan. 24, 2024

(87) PCT Pub. No.: WO2023/032512
PCT Pub. Date: Mar. 9, 2023

(65) Prior Publication Data
US 2024/0260155 A1      Aug. 1, 2024

(30) Foreign Application Priority Data

Aug. 31, 2021  (JP) .................. 2021-141979

(51) Int. Cl.
*H05B 45/37* (2020.01)
*H05B 47/19* (2020.01)

(52) U.S. Cl.
CPC ............. *H05B 45/37* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 12,326,246 B2 * | 6/2025 | Hendler | H01R 25/14 |
| 2013/0169191 A1 * | 7/2013 | Ootsuka | H05B 47/25 315/307 |
| 2017/0127491 A1 * | 5/2017 | Pope | H05B 45/12 |
| 2018/0069397 A1 * | 3/2018 | Dendas | H05B 45/3725 |

FOREIGN PATENT DOCUMENTS

| | | |
|---|---|---|
| EP | 3866570 A1 | 8/2021 |
| IT | 201900021600 A1 | 5/2021 |
| JP | 2010-147002 A | 7/2010 |
| JP | 2020-119673 A | 8/2020 |
| JP | 2021-22430 A | 2/2021 |

OTHER PUBLICATIONS

International Search Report for corresponding Application No. PCT/JP2022/028388, mailed Sep. 20, 2022.
Written Opinion for corresponding Application No. PCT/JP2022/028388, mailed Sep. 20, 2022.
Extended European Search Report dated Nov. 18, 2024 for corresponding EP Application No. 22864100.7.

* cited by examiner

*Primary Examiner* — Kenneth B Wells
(74) *Attorney, Agent, or Firm* — Renner, Otto, Boisselle & Sklar, LLP

(57) ABSTRACT

A circuit device (10) is a circuit device to be attached to an electrified track (50). The circuit device (10) includes: an attachment mechanism (12) for attaching the circuit device (10) to the electrified track (50); and a power conversion circuit that converts DC power supplied from the electrified track (50). In a state in which the circuit device (10) is attached to the electrified track (50), the power conversion circuit is at least partially located inside the electrified track (50).

11 Claims, 8 Drawing Sheets

CIRCUIT DEVICE AND LIGHTING DEVICE

TECHNICAL FIELD

The present invention relates to a circuit device to be attached to an electrified track.

BACKGROUND ART

In recent years, lighting devices (lighting fixtures) including light emitting diodes (LEDs) as light sources have become increasingly popular. For example, Patent Literature (PTL) 1 discloses a lighting fixture to be attached to an electrified track.

CITATION LIST

Patent Literature

[PTL 1]
Japanese Unexamined Patent Application Publication No. 2020-119673

SUMMARY OF INVENTION

Technical Problem

The present invention provides a circuit device that is less likely to become visual noise for users, and a lighting device including the circuit device.

Solution to Problem

A circuit device according to one aspect of the present invention is a circuit device to be attached to an electrified track. The circuit device includes: an attachment mechanism for attaching the circuit device to the electrified track; and a power conversion circuit that converts DC power supplied from the electrified track. In a state in which the circuit device is attached to the electrified track, the power conversion circuit is at least partially located inside the electrified track.

A lighting device according to one aspect of the present invention includes: the circuit device described above; and a light source device that illuminates surroundings of the circuit device by emitting light using power obtained by conversion by the power conversion circuit.

Advantageous Effects of Invention

The present invention enables implementation of the circuit device that is less likely to become visual noise for users, and the lighting device including the circuit device.

DESCRIPTION OF EMBODIMENTS

Figure 1:
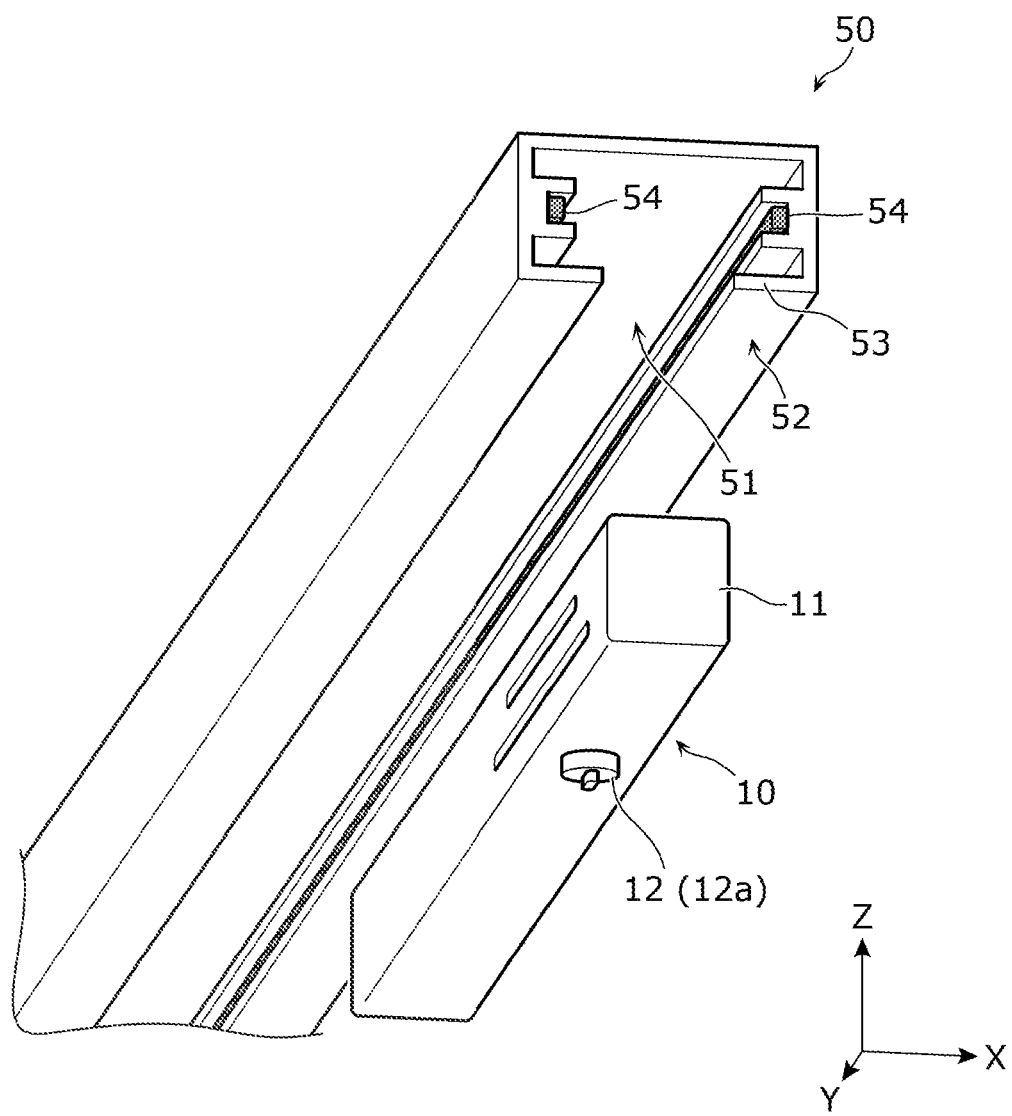
FIG. 1 is a perspective view illustrating a first appearance of a circuit device according to Embodiment 1.

Hereinafter, certain exemplary embodiments are described with reference to the accompanying drawings. Each of the exemplary embodiments described below shows a general or specific example. The numerical values, shapes, materials, elements, the arrangement and connection of the elements, etc. shown in the following exemplary embodiments are mere examples, and therefore do not limit the scope of the present invention. Among the elements in the following exemplary embodiments, those not recited in any one of the independent claims, representing the most superordinate concept, are described as optional elements.

Each of the drawings is a schematic diagram and is not necessarily an illustration drawn in a strict sense. In each of the Drawings, substantially identical elements are denoted by the same reference numerals, and duplicated descriptions may be omitted or simplified.

Coordinate axes may be indicated in the drawings used to describe the following embodiments. A Z-axis direction is described as a height direction of a lighting device. A Z-axis positive (+) side may be described as an upper side (upside), and a Z-axis negative (−) side may be described as a lower side (downside). An X-axis direction and a Y-axis direction are directions orthogonal to each other in a plane perpendicular to the Z-axis direction. In the following embodiments, planar view means viewing from the Z-axis direction.

Figure 2:
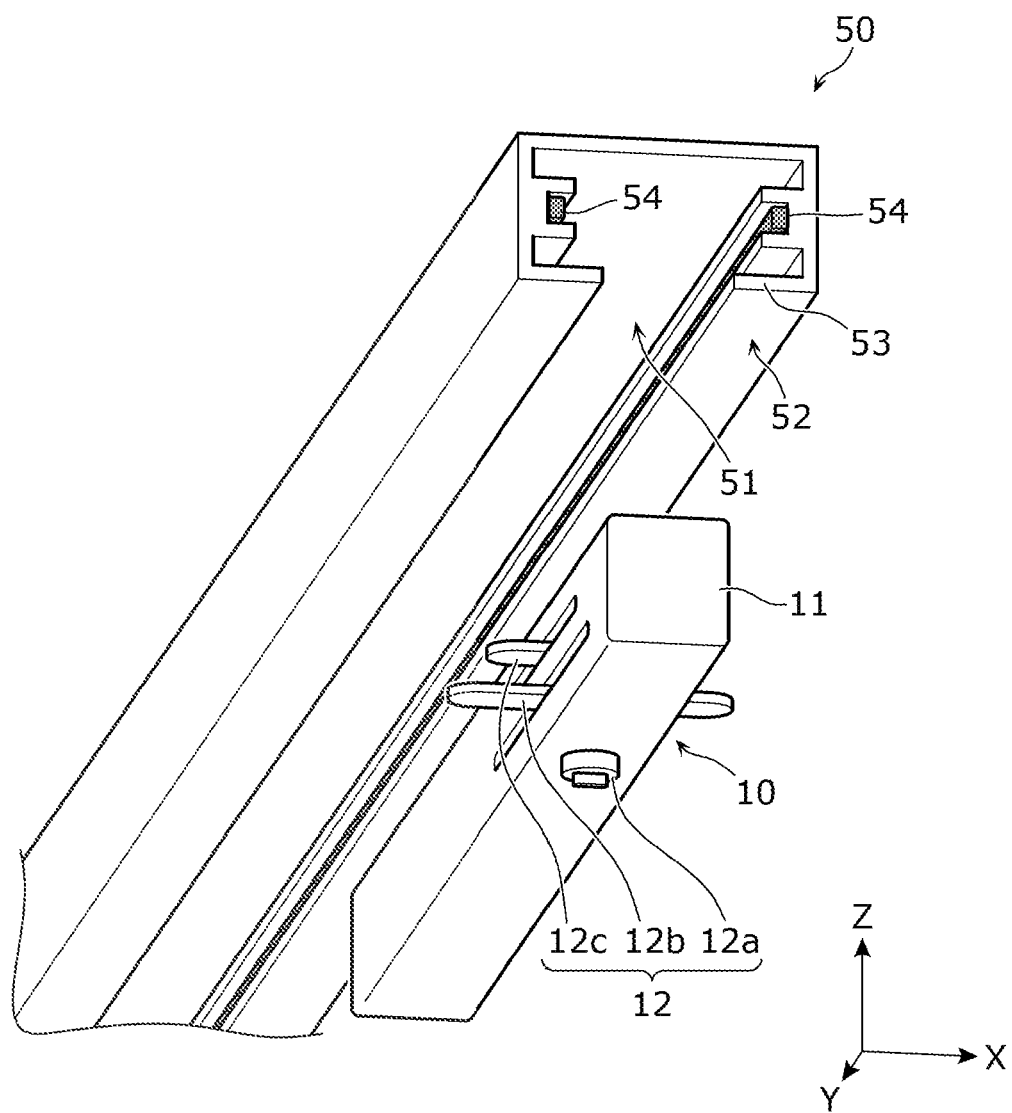
FIG. 2 is a perspective view illustrating a second appearance of the circuit device according to Embodiment 1.
Figure 3:
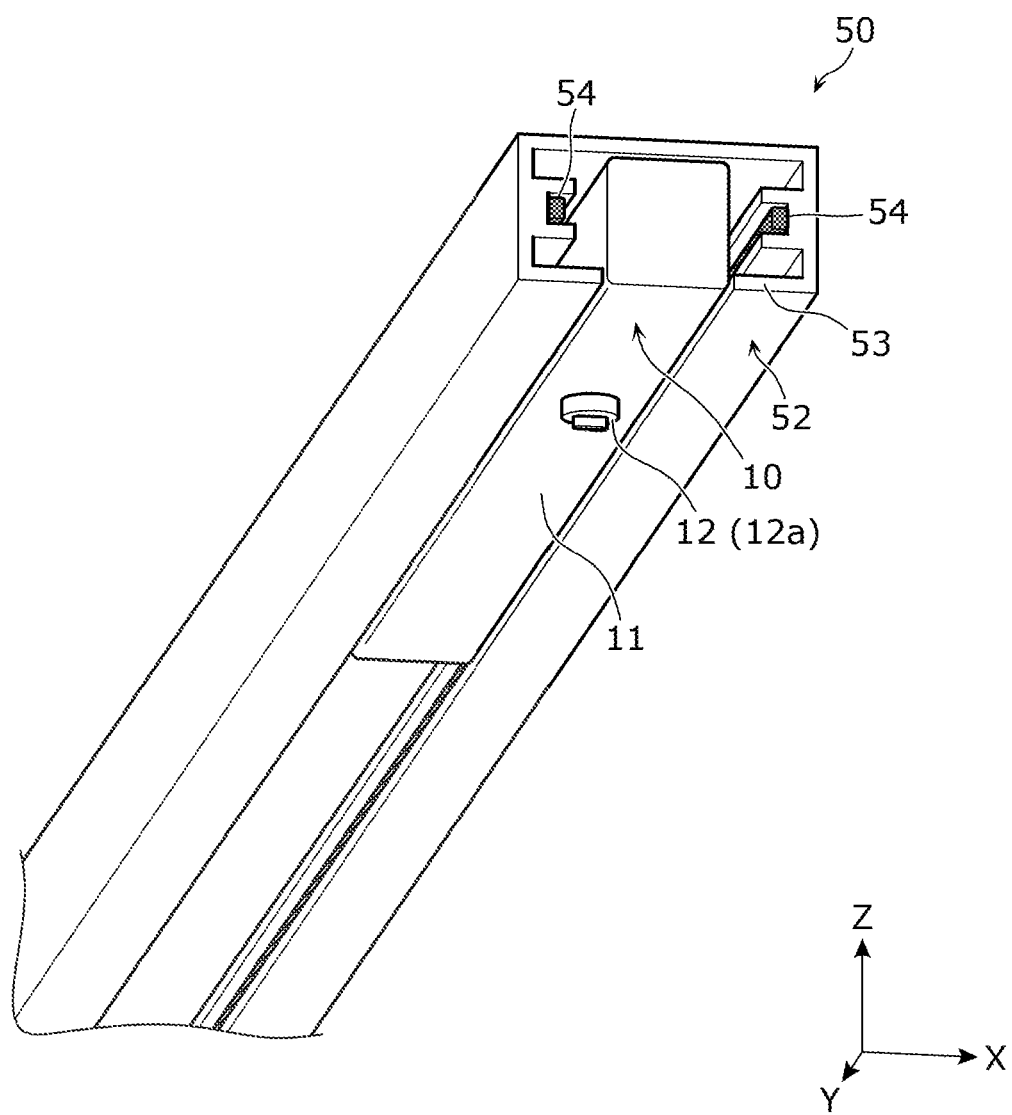
FIG. 3 is a perspective view illustrating a third appearance of the circuit device according to Embodiment 1.
Figure 4:
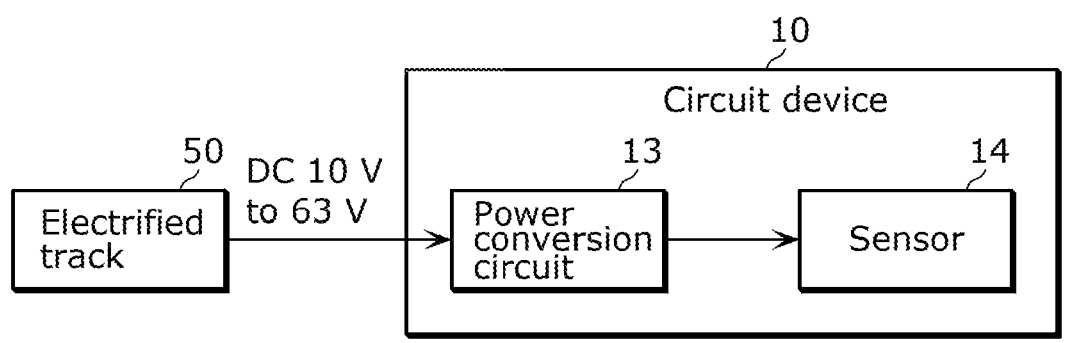
FIG. 4 is a block diagram illustrating a functional configuration of the circuit device according to Embodiment 1.

A configuration of a circuit device according to Embodiment 1 will be described below. FIGS. 1 to 3 each show a perspective view illustrating an appearance of the circuit device according to Embodiment 1. FIG. 1 is a diagram illustrating a state in which locking part 12b and a pair of electrodes 12c included in circuit device 10 are housed inside enclosure 11. FIG. 2 is a diagram illustrating a state in which locking part 12b and the pair of electrodes 12c, which are included in circuit device 10, protrude outward from enclosure 11. FIG. 3 is a diagram illustrating a state in which circuit device 10 is attached to electrified track 50. FIG. 4 is a block diagram illustrating a functional configuration of circuit device 10.

As shown in FIGS. 1 to 4, circuit device 10 according to Embodiment 1 is attached to electrified track 50 and operates by receiving DC power from electrified track 50. Electrified track 50 is sometimes referred to as a duct rail or a sliding outlet. The DC power (DC voltage) supplied from electrified track 50 is, for example, 10 V or more and 63 V or less. A rated voltage of circuit device 10 is 63 V or less. Circuit device 10 includes enclosure 11, attachment mechanism 12, power conversion circuit 13, and sensor 14.

Enclosure 11 will be described first. Enclosure 11 houses power conversion circuit 13 and sensor 14. Enclosure 11 is, for example, of a rectangular parallelepiped shape that is elongated along a longitudinal direction of electrified track 50. Enclosure 11 is formed, for example, by a resin material, but may also be formed by a metal material with a surface subjected to insulating treatment.

As shown in FIG. 3, in the state in which circuit device 10 is attached to electrified track 50, enclosure 11 is entirely located within groove 51 included in electrified track 50. More specifically, in the state in which circuit device 10 is attached to electrified track 50, no part of enclosure 11 protrudes below lower surface 52 of electrified track 50. This prevents enclosure 11 from becoming visual noise. A height (length in the Z-axis direction) of enclosure 11 is, for example, 15 mm or less, a width (length in the X-axis direction) of enclosure 11 is, for example, 14 mm or less, and a length (length in the Y-axis direction) of enclosure 11 is, for example, 200 mm or less.

Attachment mechanism 12 will be described next. Attachment mechanism 12 is a mechanism for attaching circuit device 10 to electrified track 50. Attachment mechanism 12 includes knob 12a, locking part 12b, and the pair of electrodes 12c (in FIG. 2, only one of the pair of electrodes 12c is shown). Knob 12a and locking part 12b are formed, for example, by a resin material, and the pair of electrodes 12c are formed, for example, by a metal material such as copper.

Knob 12a is a structure to be turned by a user and is provided on a lower surface of enclosure 11. Knob 12a is connected to locking part 12b and the pair of electrodes 12c via a shaft (not shown). By turning knob 12a, the user can switch between the state in which locking part 12b and the pair of electrodes 12c are housed inside enclosure 11 (the state shown in FIG. 1) and the state in which locking part 12b and the pair of electrodes 12c protrude outward from enclosure 11 (the state shown in FIG. 2).

When attaching circuit device 10 to electrified track 50, the user pushes, into groove 51, circuit device 10 with locking part 12b and electrodes 12c being housed inside enclosure 11 and turns knob 12a. This causes locking part 12b, which has been housed inside enclosure 11, to protrude outward from slits provided through side surfaces of enclosure 11. As a result, locking part 12b is caught on bottom portion 53 inside electrified track 50. The pair of electrodes 12c protrude outward from slits provided through the side surfaces of enclosure 11 to contact a pair of power supply terminals 54 provided inside electrified track 50. As a result, the pair of electrodes 12c are electrically connected to the pair of power supply terminals 54. Thus, circuit device 10 can be supplied with DC power from electrified track 50 via the pair of electrodes 12c.

When removing circuit device 10 from electrified track 50, the user turns knob 12a to house locking part 12b and the pair of electrodes 12c, which have been protruded from the side surfaces of enclosure 11, inside enclosure 11. This allows circuit device 10 to be removed from electrified track 50.

According to attachment mechanism 12, the electrical connection and disconnection of the pair of electrodes 12c to and from power supply terminals 54 (electrified track 50) are linked with attachment mechanism 12, but do not necessarily need to be linked with attachment mechanism 12. For example, another knob may be provided to switch between the electrical connection of the pair of electrodes 12c to power supply terminals 54 (electrified track 50) and the electrical disconnection of the pair of electrodes 12c from power supply terminals 54.

A mechanism such as attachment mechanism 12, in which knob 12a is turned to move locking part 12b and the pair of electrodes 12c, is a mere example. For example, a mechanism in which a pin or a metal fitting is pushed out of enclosure 11 by an elastic member may be employed as attachment mechanism 12. Also, an attachment mechanism such as that disclosed in PTL 1 (Japanese Unexamined Patent Application Publication No. 2020-119673) may be employed as attachment mechanism 12.

Figure 5:
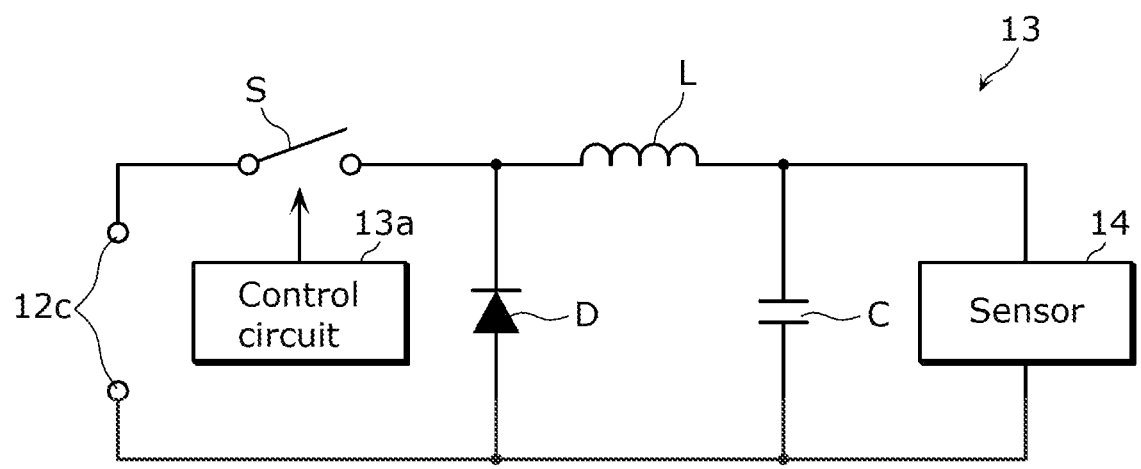
FIG. 5 is a diagram illustrating an example of a circuit configuration of a power conversion circuit included in the circuit device according to Embodiment 1.

Power conversion circuit 13 will be described next. Power conversion circuit 13 is a direct current (DC)-DC converter that converts DC power supplied from electrified track 50 into DC power with a different voltage. Specifically, power conversion circuit 13 is a non-isolated DC-DC converter that converts DC power supplied from electrified track 50 with a voltage of 10 V or more and 63 V or less into DC power with a voltage suitable for operations of sensor 14. FIG. 5 is a diagram illustrating an example of a circuit configuration of power conversion circuit 13. FIG. 5 shows an example of the circuit configuration, and any existing circuit configuration may be used for power conversion circuit 13.

Power conversion circuit 13 is implemented by mounting circuit components on a board. As shown in FIG. 5, the circuit components of power conversion circuit 13 include, for example, control circuit 13a, switching element S, diode D, inductor L, and smoothing capacitor C. In FIG. 5, the pair of electrodes 12c and sensor 14 are also illustrated together.

Control circuit 13a is a control circuit that controls on and off of switching element S. Specifically, control circuit 13a is a packaged integrated circuit (IC). Control circuit 13a switches a DC voltage applied between the pair of electrodes 12c by controlling the on and off of switching element S. As a result, a high-frequency voltage is outputted to inductor L. Switching element S is, for example, a field effect transistor (FET), but may also be a bipolar A switching element made of gallium nitride (GaN) transistor, semiconductor may be employed as switching element S as necessary.

Specifically, inductor L is a choke coil (choke transformer), and current corresponding to the on and off of switching element S flows through inductor L. A sheet coil may be employed as inductor L as necessary.

Diode D is a reflux diode that regenerates current when switching element S is off. Smoothing capacitor C smooths the current outputted from inductor L. Power smoothed by smoothing capacitor C is outputted to sensor 14.

As shown in FIG. 5, since the power supplied from electrified track 50 is DC power, power conversion circuit 13 does not need to include circuits (such as a rectifier circuit or a smoothing circuit) used to convert AC power into DC power. As mentioned above, the DC power (DC voltage) supplied from electrified track 50 is, for example, 10 V or more and 63 V or less, and the rated voltage of circuit device 10 is 63 V or less. In this case, an insulation distance (a creeping distance on the board) required to be maintained in order to configure power conversion circuit 13 becomes shorter. Specifically, the insulation distance when the rated voltage of circuit device 10 is 63 V or less is about 40% of an insulation distance when the rated voltage of circuit device 10 is 100 V.

The above allows power conversion circuit 13 to be compactly formed, and allows power conversion circuit 13 to be entirely located inside electrified track 50. Power conversion circuit 13 being located inside electrified track 50 means that power conversion circuit 13 is at least partially located in groove 51.

For example, the expression that power conversion circuit 13 is located inside electrified track 50 includes a case where the entire (whole) power conversion circuit 13 is located in groove 51 and a lower end of power conversion circuit 13 (the board on which the circuit components are mounted) does not protrude below lower surface 52 of electrified track 50. The expression that power conversion circuit 13 is located inside electrified track 50 also includes a case where all of the circuit components substantially constituting power conversion circuit 13 are located in groove 51 and do not protrude below lower surface 52 of electrified track 50.

Even if sensor 14 or a wireless communicator, for example, is mounted on the same board as power conversion circuit 13, these components are not included in the circuit components substantially constituting power conversion circuit 13, because these components do not contribute to substantial power conversion.

The expression that power conversion circuit 13 is located inside electrified track 50 also includes a case where only part of power conversion circuit 13 is located in groove 51. For example, the expression that power conversion circuit 13 is located in groove 51 includes a case where, for example, 80% or more of a volume of power conversion circuit 13 (the board on which the circuit components are mounted) is located in groove 51. The expression that power conversion circuit 13 is located in groove 51 also includes a case where a half or more than half of the circuit components (e.g., control circuit 13a, switching element S, diode D, inductor L, and smoothing capacitor C) of power conversion circuit 13 are located in groove 51.

An arrangement of power conversion circuit 13 in enclosure 11 is not limited to any particular arrangement. Power conversion circuit 13 may be arranged in enclosure 11 such that a main surface of the board is along a Y-Z plane, or may be arranged in enclosure 11 such that the main surface of the board is along an X-Y plane.

Although power conversion circuit 13 has been described as a DC-DC converter, power conversion circuit 13 may also be a DC-AC (alternating current) converter (inverter). For example, if a load included in enclosure 11 is not sensor 14 but a motor, for example, a DC-AC converter is employed as power conversion circuit 13. Any existing circuit configuration may be employed as a circuit configuration of the DC-AC converter.

Sensor 14 will be described next. Sensor 14 performs sensing using power obtained by conversion by power conversion circuit 13. Sensor 14 is an environmental sensor that measures an environment surrounding circuit device 10, such as a temperature sensor, a humidity sensor, a carbon dioxide concentration sensor, or an electric field sensor, for example. Sensor 14 is mounted on the board of power conversion circuit 13, for example, but may also be mounted on a board different from the board of power conversion circuit 13. If circuit device 10 includes a wireless communication circuit, measured values of sensor 14 are transmitted to an external device by the wireless communication circuit. If circuit device 10 includes a display, the measured values of sensor 14 may be displayed on the display.

Effects, Etc.

As described above, circuit device 10 is a circuit device to be attached to electrified track 50. Circuit device 10 includes: attachment mechanism 12 for attaching circuit device 10 to electrified track 50; and power conversion circuit 13 that converts DC power supplied from electrified track 50. In a state in which circuit device 10 is attached to electrified track 50, power conversion circuit 13 is at least partially located inside electrified track 50.

Circuit device 10 described above can be said to be a circuit device that is less likely to become visual noise for users because a portion of circuit device 10 protruding from electrified track 50 is reduced.

For example, circuit device 10 further includes electrode 12c to be electrically connected to electrified track 50 in order for power conversion circuit 13 to be supplied with the DC power. Electrical connection of electrode 12c to electrified track 50 and electrical disconnection of electrode 12c from electrified track 50 are linked with attachment mechanism 12.

Circuit device 10 described above can be electrically connected to electrified track 50 in a manner linked with the attachment.

For example, power conversion circuit 13 includes switching element S, and switching element S is made of gallium nitride semiconductor.

Circuit device 10 described above can achieve increased output and miniaturization of power conversion circuit 13.

For example, a rated voltage of circuit device 10 is at most 63 V.

Circuit device 10 described above can achieve miniaturization of power conversion circuit 13 because the insulation distance required for power conversion circuit 13 to maintain is relatively short.

For example, circuit device 10 further includes sensor 14 that performs sensing using power obtained by conversion by power conversion circuit 13.

Circuit device 10 described above can be used for sensing.

For example, in the state in which circuit device 10 is attached to electrified track 50, power conversion circuit 13 is entirely located inside electrified track 50.

Circuit device 10 described above is less likely to become visual noise for users because a portion of circuit device 10 protruding from electrified track 50 can be significantly reduced.

Embodiment 2

Figure 6:
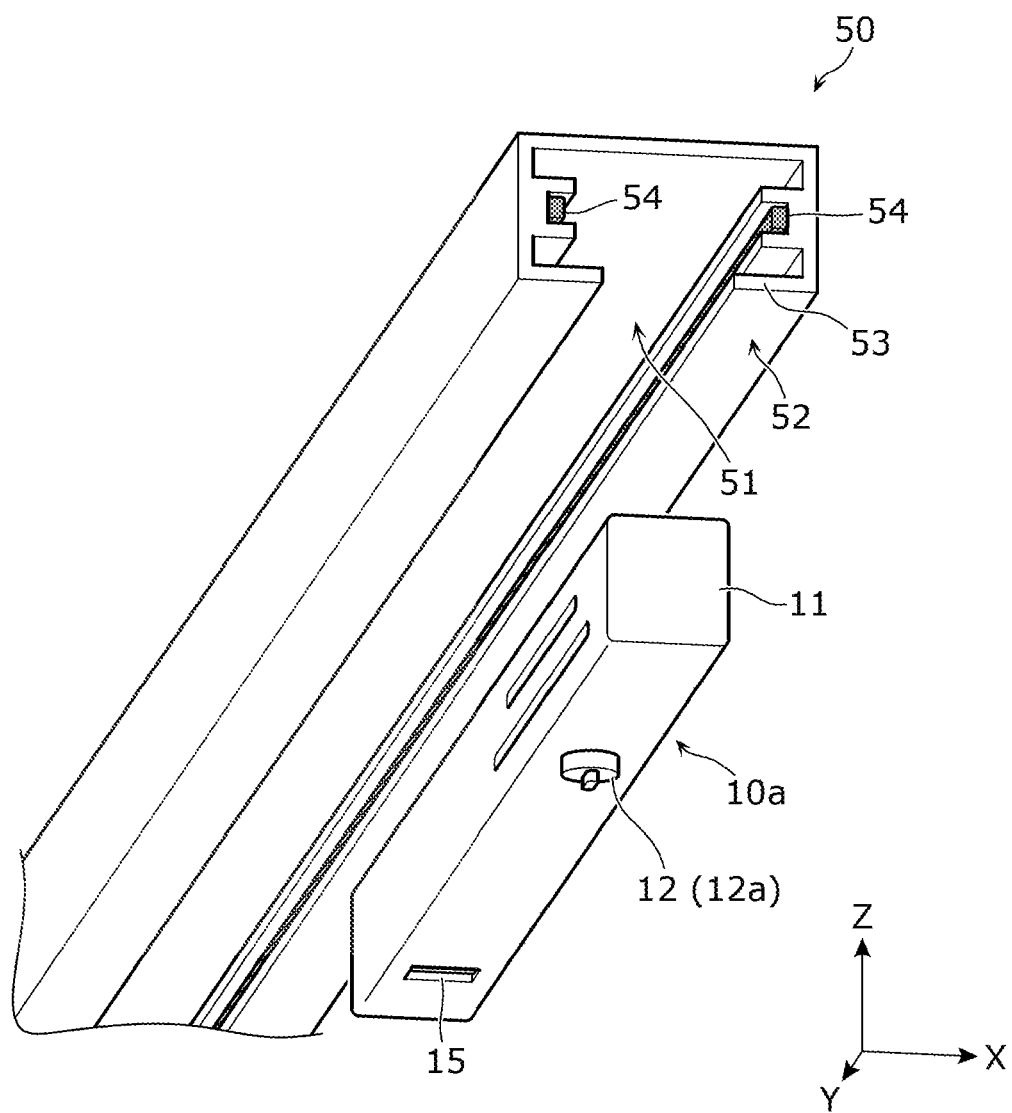
FIG. 6 is a perspective view illustrating an appearance of a circuit device according to Embodiment 2.
Figure 7:
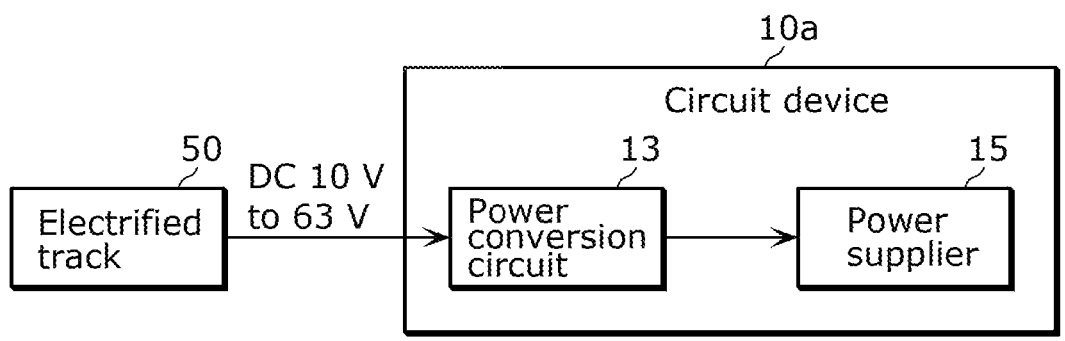
FIG. 7 is a block diagram illustrating a functional configuration of the circuit device according to Embodiment 2.

A configuration of a circuit device according to Embodiment 2 will be described below. FIG. 6 is a perspective view illustrating an appearance of the circuit device according to Embodiment 2. FIG. 7 is a block diagram illustrating a functional configuration of the circuit device according to Embodiment 2. In Embodiment 2 described below, explanations will focus on differences from Embodiment 1, and explanations of previously described matters will be omitted as appropriate.

As shown in FIGS. 6 and 7, circuit device 10a according to Embodiment 2 is attached to electrified track 50 and operates by receiving DC power from electrified track 50. Circuit device 10a includes enclosure 11, attachment mechanism 12, power conversion circuit 13, and power supplier 15. Circuit device 10a may further include sensor 14. Since enclosure 11, attachment mechanism 12, and power conversion circuit 13 have the same configurations as those in circuit device 10, detailed description of these components will be omitted.

Power supplier 15 is a terminal structure to which a different device is structurally and electrically connected for supplying power obtained by conversion by power conversion circuit 13 to the different device. Single power supplier 15 is provided, for example, on a lower surface of enclosure 11, but two or more power suppliers 15 may be provided instead. Power supplier 15 may be provided not on the lower surface of enclosure 11, but on a tip of a cable drawn from enclosure 11.

Power supplier 15 is implemented, for example, by a universal serial bus (USB) connector. Examples of such a USB connector include a variety of connectors such as USB Type-A, USB Type-B, USB Type-C, Mini USB Type-B, micro USB Type-B, and Lightning. When power supplier 15 is implemented by such a USB connector, power conversion circuit 13 converts the DC power supplied from electrified track 50 into DC power of 5 V and outputs the DC power with a voltage of 5 V to power supplier 15.

It is not essential that power supplier 15 be implemented by a USB connector. For example, power supplier 15 may be implemented by an RJ-45 connector (a connector to which a LAN (local area network) cable is connected) compliant with the Ethernet (registered trademark) standard.

Alternatively, power supplier 15 may be implemented by an AC outlet. When power supplier 15 is implemented by an AC outlet, power conversion circuit 13 is a DC-AC converter (inverter) that converts the DC power supplied from electrified track 50 into AC power.

When circuit device 10a includes two or more power suppliers 15, such two or more power suppliers 15 may all have the same type of terminal structure, or may include different types of terminal structures (e.g., a USB connector and an AC outlet).

As described above, circuit device 10a is a circuit device to be attached to electrified track 50, including: attachment mechanism 12 for attaching circuit device 10a to electrified track 50; power conversion circuit 13 that converts the DC power supplied from electrified track 50; and power supplier 15 to which a different device is connected for supplying the power obtained by the conversion by power conversion circuit 13 to the different device. In a state in which circuit device 10a is attached to electrified track 50, power conversion circuit 13 is at least partially located inside electrified track 50.

Circuit device 10a described above (a device that supplies the converted power to other devices) that is less likely to become visual noise for users because a portion of circuit device 10a protruding from electrified track 50 is reduced.

Figure 8:
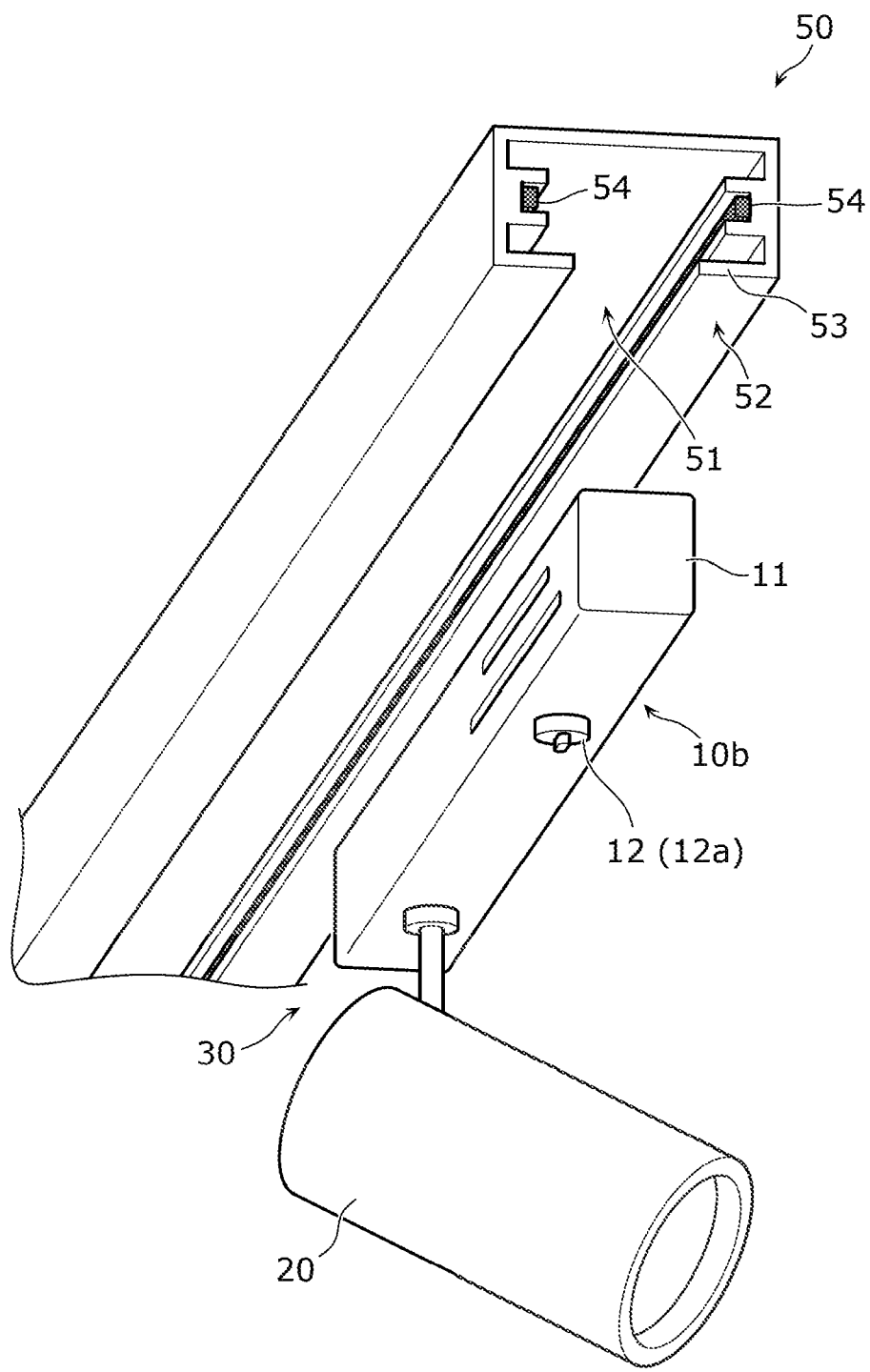
FIG. 8 is a perspective view illustrating an appearance of a lighting device according to Embodiment 3.
Figure 9:
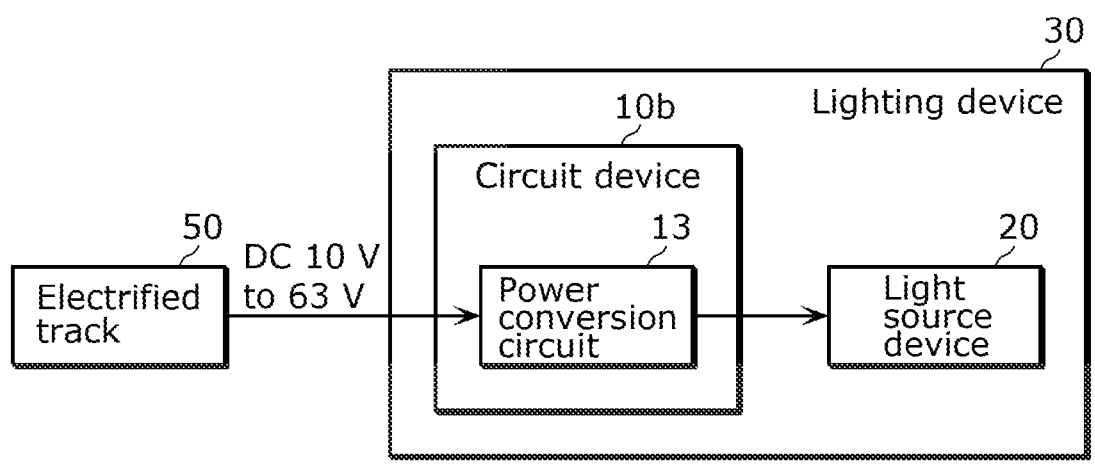
FIG. 9 is a block diagram illustrating a functional configuration of the lighting device according to Embodiment 3.

A configuration of a lighting device according to Embodiment 3 will be described below. FIG. 8 is a perspective view illustrating an appearance of the lighting device according to Embodiment 3. FIG. 9 is a block diagram illustrating a functional configuration of the lighting device according to Embodiment 3. In Embodiment 3 described below, explanations will focus on differences from Embodiment 1 and Embodiment 2, and explanations of previously described matters will be omitted as appropriate.

As shown in FIGS. 8 and 9, lighting device 30 according to Embodiment 3 is known as a spotlight and includes circuit device 10b and light source device 20. Note that the present invention may be implemented as a lighting device other than a spotlight, such as a pendant light.

Circuit device 10b is attached to electrified track 50 and operates by receiving DC power from electrified track 50. Circuit device 10b includes enclosure 11, attachment mechanism 12, and power conversion circuit 13. Circuit device 10b may further include at least one of sensor 14 or power supplier 15. Since enclosure 11, attachment mechanism 12, and power conversion circuit 13 have the same configurations as those in circuit device 10, detailed description of these components will be omitted.

Light source device 20 illuminates the surroundings of circuit device 10b by emitting light using power obtained by conversion by power conversion circuit 13. Light source device 20 is provided on a lower surface of enclosure 11. Specifically, light source device 20 is implemented, for example, by a light emitting module that emits light using the DC power supplied by power conversion circuit 13, and a lens for diffusing or collimating the light emitted by the light emitting module.

The light emitting module is formed, for example, by mounting LED elements on a board and emits white light. The light emitting module may be a chip-on-board (COB) light emitting module or a surface-mount-device (SMD) light emitting module. The light emitting module may be implemented by a light emitting element other than an LED element, such as an organic electro-luminescence (EL) element. The lens is, for example, a convex lens such as a Fresnel lens.

As described above, lighting device 30 includes circuit device 10b and light source device 20 that illuminates the surroundings of circuit device 10b by emitting light using the power obtained by the conversion by power conversion circuit 13. Circuit device 10b is attached to electrified track 50, including attachment mechanism 12 for attaching circuit device 10b to electrified track 50 and power conversion circuit 13 that converts the DC power supplied from electrified track 50. In a state in which circuit device 10b is attached to electrified track 50, power conversion circuit 13 is located inside electrified track 50.

Lighting device 30 described above that is less likely to become visual noise for users because a portion of lighting device 30 protruding from electrified track 50 is reduced.

Although the exemplary embodiments have been described above, the present invention is not limited to the above embodiments.

For example, the general or specific aspects of the present invention may be implemented using a system or a device. For example, the present invention may be implemented as a system including the circuit device according to any one of the above embodiments and the electrified track.

Forms obtained by making various modifications to each of the above embodiments that can be conceived by those skilled in the art, or forms obtained by combining the structural components and the functions in the embodiments, without materially departing from the spirit of the present invention, may be included in the scope of the present Invention.

REFERENCE SIGNS LIST

10, 10a, 10b Circuit device
11 Enclosure
12 Attachment mechanism
12b Locking part
12c Electrode
13 Power conversion circuit
13a Control circuit
14 Sensor
15 Power supplier
20 Light source device
30 Lighting device
50 Electrified track
51 Groove
52 Lower surface
53 Bottom portion
54 Power supply terminal

The invention claimed is:

1. A circuit device to be attached to an electrified track, the circuit device comprising:
   an attachment mechanism for attaching the circuit device to the electrified track;
   a power conversion circuit that converts DC power supplied from the electrified track; and
   a power supplier to which a different device is connected for supplying power obtained by conversion by the power conversion circuit to the different device,
   wherein in a state in which the circuit device is attached to the electrified track, the power conversion circuit is at least partially located inside the electrified track; and the power supplier is a USB connector, an RJ-45 connector, or an AC outlet.

2. The circuit device according to claim 1, further comprising:
an electrode to be electrically connected to the electrified track in order for the power conversion circuit to be supplied with the DC power,
wherein electrical connection of the electrode to the electrified track and electrical disconnection of the electrode from the electrified track are linked with the attachment mechanism.

3. The circuit device according to claim 1,
wherein the power conversion circuit includes a switching element, and
the switching element is made of gallium nitride semiconductor.

4. The circuit device according to claim 1,
wherein a rated voltage of the circuit device is at most 63 V.

5. The circuit device according to claim 1, further comprising:
a sensor that performs sensing using power obtained by conversion by the power conversion circuit.

6. The circuit device according to claim 1,
wherein in the state in which the circuit device is attached to the electrified track, the power conversion circuit is entirely located inside the electrified track.

7. A lighting device comprising:
the circuit device according to claim 1; and
a light source device that illuminates surroundings of the circuit device by emitting light using power obtained by conversion by the power conversion circuit.

8. The circuit device according to claim 1, further comprising:
an enclosure that houses the power conversion circuit,
wherein the power supplier is provided on a surface of the enclosure or a tip of a cable drawn from the enclosure.

9. The circuit device according to claim 1,
wherein the power supplier is a USB connector or an RJ-45 connector.

10. The circuit device according to claim 1,
wherein the power conversion circuit is a DC-AC converter configured to convert direct current supplied from the electrified track to alternating current, and
the power supplier is an AC outlet.

11. The circuit device according to claim 1, comprising:
a plurality of power suppliers, the plurality of power suppliers each being the power supplier,
wherein the plurality of power suppliers include at least two of a USB connector, an RJ-45 connector, and an AC outlet.

* * * * *